July 29, 1969   E. B. BERKLEY   3,457,696
METHOD AND APPARATUS FOR ENCLOSING MATERIAL IN A MAILING PIECE
Filed Sept. 21, 1966   7 Sheets-Sheet 1

Fig. 1.

INVENTOR.
EUGENE B. BERKLEY
BY
Fishburn & Gold
ATTORNEYS

July 29, 1969   E. B. BERKLEY   3,457,696
METHOD AND APPARATUS FOR ENCLOSING MATERIAL IN A MAILING PIECE
Filed Sept. 21, 1966   7 Sheets-Sheet 2

INVENTOR.
EUGENE B. BERKLEY
BY
*Fishburn & Gold*
ATTORNEYS

July 29, 1969   E. B. BERKLEY   3,457,696
METHOD AND APPARATUS FOR ENCLOSING MATERIAL IN A MAILING PIECE
Filed Sept. 21, 1966   7 Sheets-Sheet 5

INVENTOR.
EUGENE B. BERKLEY
BY
Fishburn & Gold
ATTORNEYS

Fig. 6.

July 29, 1969   E. B. BERKLEY   3,457,696
METHOD AND APPARATUS FOR ENCLOSING MATERIAL IN A MAILING PIECE
Filed Sept. 21, 1966   7 Sheets-Sheet 7

INVENTOR.
EUGENE B. BERKLEY
BY
Fishburn & Gold.
ATTORNEYS

United States Patent Office 3,457,696
Patented July 29, 1969

3,457,696
METHOD AND APPARATUS FOR ENCLOSING MATERIAL IN A MAILING PIECE
Eugene B. Berkley, Shawnee Mission, Kans., assignor to Tension Envelope Corporation, Kansas City, Mo., a corporation of Delaware
Continuation-in-part of application Ser. No. 503,476, Oct. 22, 1965. This application Sept. 21, 1966, Ser. No. 580,942
Int. Cl. B65b 11/48, 11/06, 49/00
U.S. Cl. 53—31         11 Claims

ABSTRACT OF THE DISCLOSURE

Envelopes are formed around a non-adhering insert by continuously propelling a blank along a path with a body portion of the blank exposed, bringing an insert into overlying contacting non-adhering relation with the body while the blank and insert are continuously and simultaneously propelled along the path, continuously effecting engagement with opposed driven feed surfaces of the blank and insert so that the insert cannot move with respect to the blank during propulsion, and while this relationship is retained, folding the blank to enclose the insert.

---

This invention relates to a method and apparatus for the formation of envelopes and more particularly, for the formation of envelopes having an insert enclosed therein during said formation process; the present application being a continuation-in-part application of my copending application for U.S. Letters Patent filed Oct. 22, 1965, Ser. No. 503,476, now abandoned.

The principal objects of this invention are: to provide a method and apparatus for the formation of a mailing piece consisting of an envelope with inserts therein; to provide such an envelope with one or more inserts enclosed therein in a continuous high speed manner; to provide such a method and apparatus for the production of a greater quantity of envelopes having one or more inserts enclosed therein in a unit of time than has heretofore been possible with present methods and equipment, the placement of said inserts on an envelope blank as said blank is being propelled through a continuous high speed rotary envelope making process with said envelope being formed from said blank and around said insert, said method and apparatus being capable of producing from 30,000 to 60,000 stuffed and sealed envelopes in one hour, several times in excess of present day methods and apparatus; to provide such a method and apparatus wherein the means for placing the insert on the envelope blank may be incorporated into a standard conventional rotary envelope making machine; to provide a method and apparatus wherein application of adhesive to the closure flap is at the last stage of the envelope formation process and the folding and sealing of said flap produces a sealed envelope with inserts enclosed therein; and to provide such a novel and efficient method and apparatus wherein inserting may be accomplished rapidly and in an economical manner during the envelope formation process.

Other objects and advantages of this invention will become apparent from the following description taken in connection with the accompanying drawings wherein are set forth by way of illustration and example certain embodiments of this invention.

Figure 1:
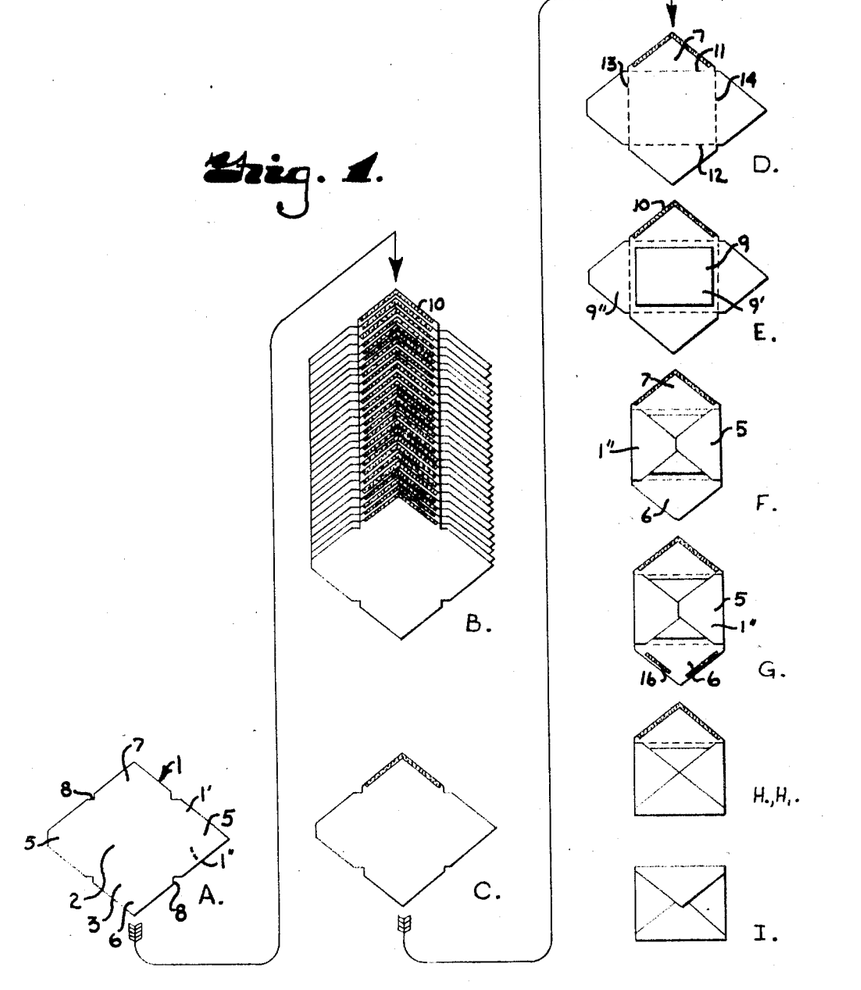
FIG. 1 is a diagrammatic view illustrating the successive steps involved in forming an envelope with an insert enclosed therein.
Figure 2:
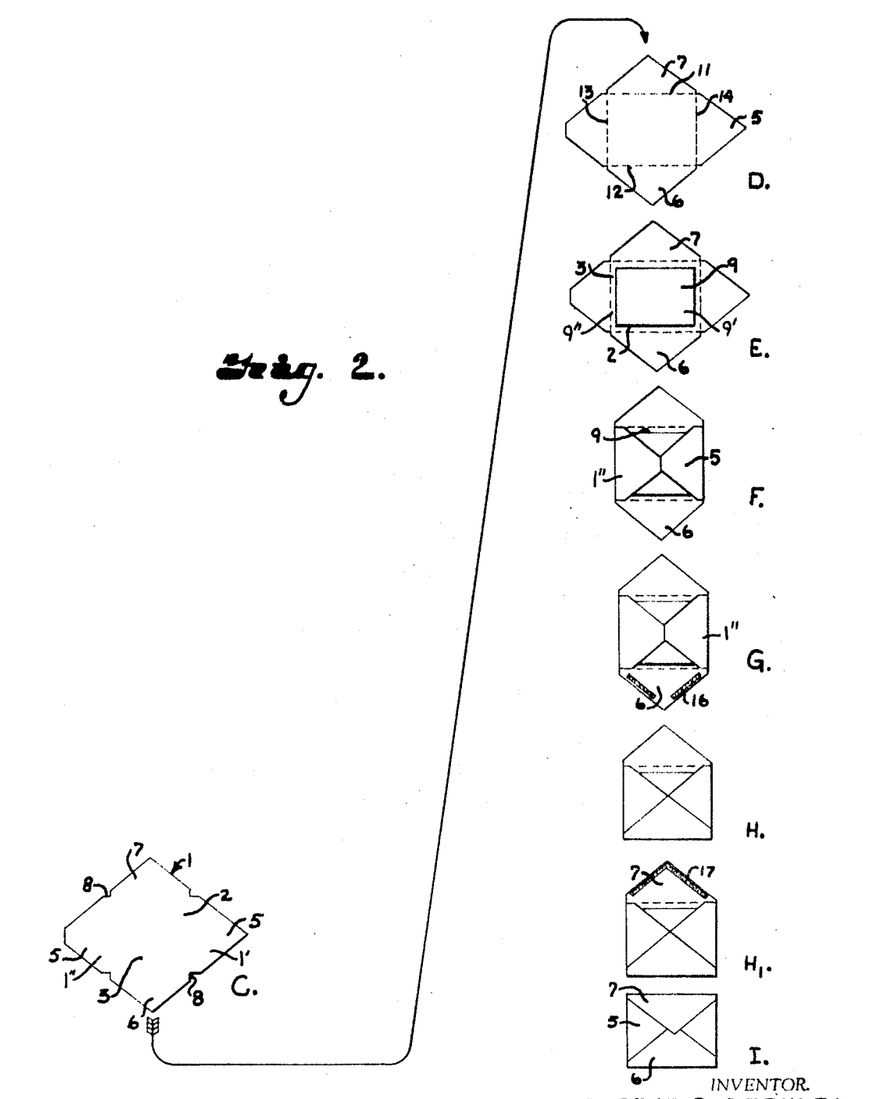
FIG. 2 is a diagrammatic view illustrating the successive steps involved in a modified method of forming envelopes having an insert enclosed therein.

Referring to the drawings in more detail:

The methods illustrated in FIGS. 1 and 2 inclusive commence with blanks 1 having an inner or upper surface 1' and an outer or lower surface 1" which are preshaped to provide a main body portion 2 having an inner face 3 and an outer face 4, side flaps 5, bottom flap 6 and closure flap 7. The envelope blank 1 also has a plurality of notches 8 in the side edges of said blank 1 at the juncture points of the side flaps 5 with the bottom flap 6 and closure flap 7. The notches 8 are utilized for registering the blank 1 within the envelope making machine and also to facilitate the forming of the corners of the envelopes.

The novel method illustrated in FIG. 1 constitutes a plurality of steps designated by letters A to I inclusive, all of which are performed while the blanks are propelled continuously at a high velocity and includes the enclosure of an insert 9, having an upper surface 9', as the steps of the envelope formation process are being continuously executed.

In practicing the method, the preshaped blanks 1 are delivered to the station or step B in a stepped or staggered formation with the upper portion of the closure flaps 7 of each blank 1 exposed for the application of a strip of adhesive 10. The envelope blanks 1 are maintained in this formation after the application of adhesive 10 for the drying of said adhesive 10. After the drying of the adhesive strip 10, the envelope blanks are successively drawn out from the stepped formation and advanced singularly in spaced relation from one another as shown at step or station C through the remainder of the envelope formation process with the inner face 3 of the main body portion 2 facing upwardly. The envelope blank 1 is advanced through station D where said blank 1 is scored along the juncture between the main body portion 2 and the closure flap 7 and bottom flap 6 to form score lines 11 and 12 respectively. At station D, the envelope blank 1 is also scored along the juncture of the main body portion 2 and the side flaps 5 to thereby form score lines 13 and 14.

The scored envelope blank 1 is then advanced through station E where insert 9 is brought into overlying contacting relation to the inner surface 3 of the main body portion 2 of the envelope blank 1, while said blank 1 and said insert 9 are being continuously and simultaneously propelled along a path at a high speed. The upper surface 9' of the insert 9 and the upper surface 1' of the blank 1 combine to form an upper engagement surface 9". In the illustrated example of FIG. 1, the insert 9 is placed on the envelope blank 1 after the scoring or formation of the score lines in said envelope blank 1; however, steps D and E could be reversed such that the scoring follows the placement of insert 9 on the envelope blank 1.

Immediately following the bringing of the insert 9 into contacting relation with the blank 1 and continuing until the said blank 1 is enclosed about said insert 9, engagement of opposed driven feed surfaces is continuously effected with the upper engagement surface 9" and the lower surface 1" of the blank 1 to continue the high speed propulsion of the insert 9 and blank 1 simultaneously along a path. This engagement is effected to maintain the relative position of the insert 9 on the body portion 2 of the blank 1 as said blank 1 and insert 9 are continuously propelled along said path at a high velocity until the relative position can be maintained by the envelope being formed from the blank 1. The driven surfaces propelling the blank 1 and insert 9 have the same directional speed.

The envelope blank 1 and insert 9 are then advanced through station F where the side flaps 5 are folded into overlying contacting relation with the insert 9 and the inside face 3 of the main body 2 of envelope blank 1. The envelope blank 1 with the insert 9 thereon is then advanced through station G where a strip of adhesive 16 is applied to the inside face of the bottom flap 6 of blank 1. The adhesive 16 has been placed on the bottom flap 6 rather than the side flaps 5 due to the difficulty in applying adhesive to parts of an envelope having varying thicknesses. It should be noted in FIG. 1 that were the adhesive strips 16 placed on side flaps 5 with an insert the size of that shown, strip 16 would extend over a portion of the side flap having the main body 2 and insert 9 underlying said side flap and a second portion of the side flap 5 having only the main body 2 underlying said flap resulting in an uneven application of adhesive along the side flap 5. At station H, the bottom flap 6 is folded into overlying contacting relation to side flaps 5 thereby sealing said bottom flap 6 to side flaps 5.

The upper engagement surface 9″ and the lower surface 1″ of the blank 1 are each continuously engaged by opposed driven feed surfaces from a point immediately following the bringing of the insert 9 into contacting relation with the blank 1 until the blank 1 is enclosed about the insert 9 to continue the high speed propulsion of the blank 1 and insert 9 with the insert 9 positioned on the body portion 2 of the blank 1.

The envelope blank 1 is then advanced through station I where the top flap or closure flap 7 is folded into overlying contacting relation with the side flap 5 and the bottom flap 6. If the envelope is to be mailed without additional enclosure, the closure flap 7 may be sealed by applying moisture to the adhesive strip 10 prior to the folding of said closure flap 7. If, however, additional inserts are to be included, the moisture application step may be omitted and the closure flap 7 merely folded.

In FIG. 2, a modification of the method disclosed in FIG. 1 is shown wherein the application of adhesive strip 10 to the closure flap 7 and the drying of said adhesive prior to envelope forming has been omitted. In practicing the method illustrated in FIG. 2, the blank envelope 1 is advanced from station C through station D and is scored in the same manner as previously described to form the various score lines. The envelope blank 1 is then advanced through stations E, F, G and H to place the insert 9 on the envelope blank 1, to fold the side flaps 5, apply the adhesive strip 16 and fold the bottom flap 6 to seal said bottom flap to the side flaps in the same manner discussed in relation to FIG. 1. The envelope blank 1 is then advanced through station H1 where an adhesive strip 17 is applied to the closure flap 7. The envelope blank 1 is then advanced through station I where the closure flap 7 is folded into overlying contacting relation to side flaps 5 and bottom flap 6 or the envelope to thereby seal the envelope with the inserts 9 enclosed therein.

Referring to FIGS. 3 through 7, an apparatus is illustrated for carrying out the aforestated methods and embodies the features of this invention. This apparatus is generally indicated by the reference numeral 20. It should be noted, however, that other apparatus may be utilized for conveying, scoring and folding the envelope blank 1 and delivering the insert 9 to the envelope blank 1.

The apparatus or machine 20 is comprised of two horizontally spaced apart side frames 21 and 22 for carrying the operating mechanisms at the different stations and for journaling the shafts of the various feed rollers and cylinders therein in a manner to be described. A support surface 23 is mounted to the side frames 21 and 22 to provide a surface over which the envelopes 1 are continuously propelled and through which the lower feed rollers and cylinders extend to cooperate with the upper cylinders and feed rollers to provide the propelling force for moving the envelope blanks 1 continuously along the support surface 23 at a high rate of speed. No attempt has been made to show the complete drive system of the apparatus 20 so the figures may be more readily understandable. A gear train has been shown connected to the shafts of the various rollers and cylinders. This gear train may be tied to the main drive system of apparatus 20 by suitable means in a conventional manner.

Figure 3:
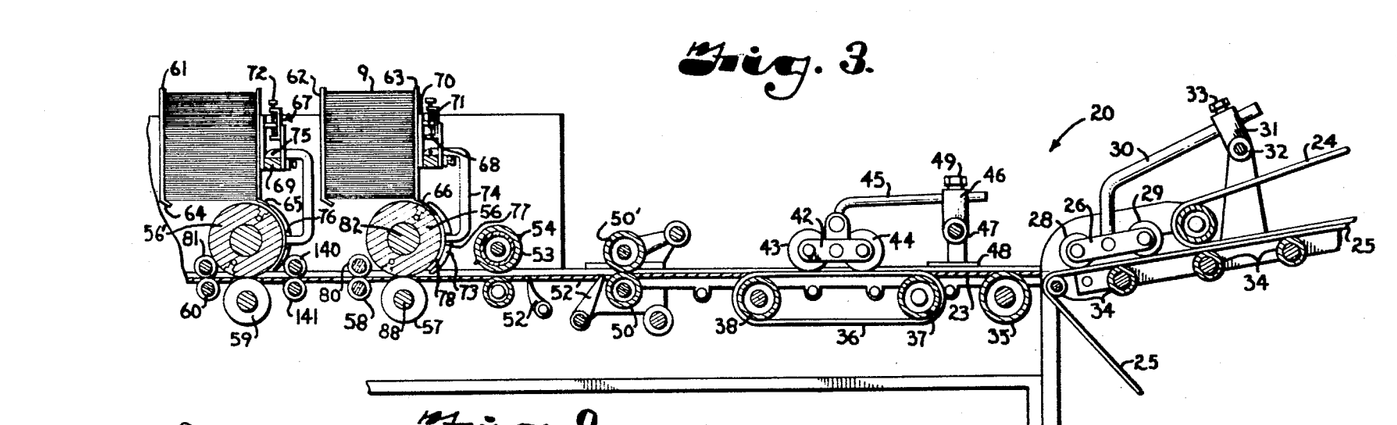
FIG. 3 is a longitudinal vertical cross-sectional view through an apparatus embodying the features of this invention.
Figure 4:
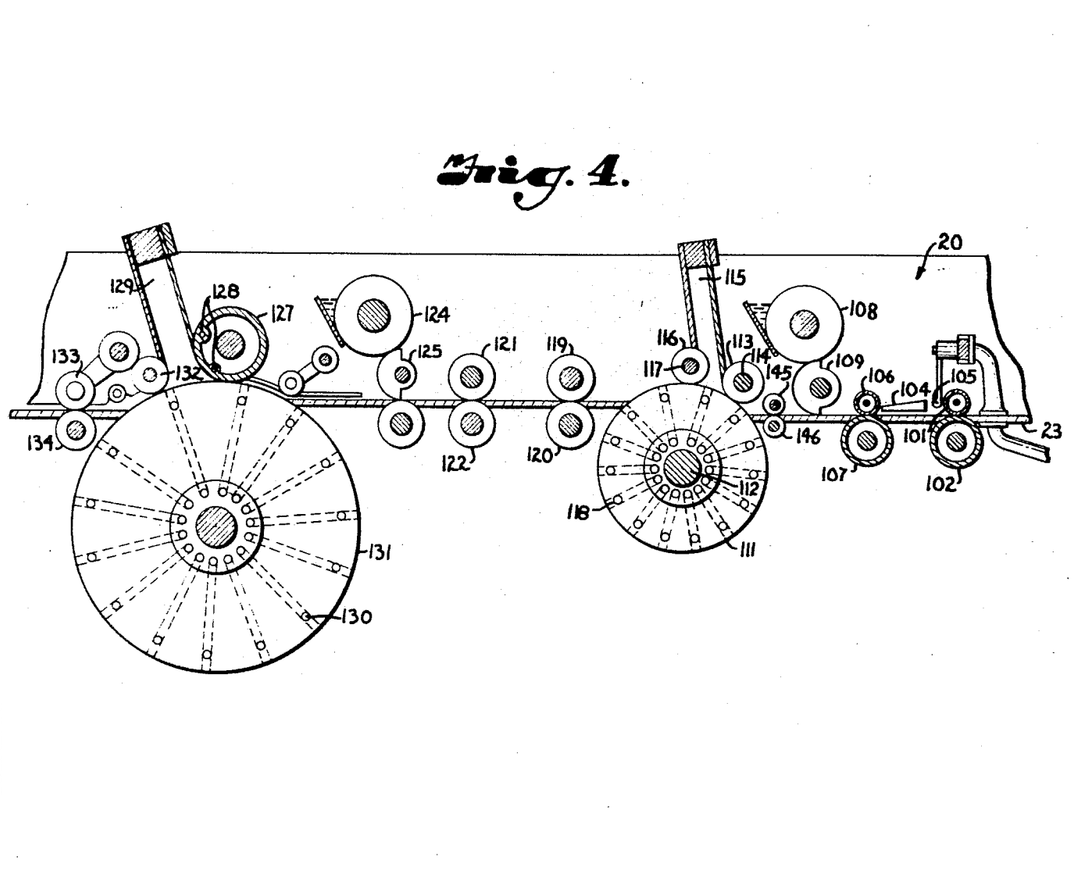
FIG. 4 is a longitudinal vertical cross-sectional view in continuation of FIG. 3 of a machine illustrating the features of this invention.
Figure 5:
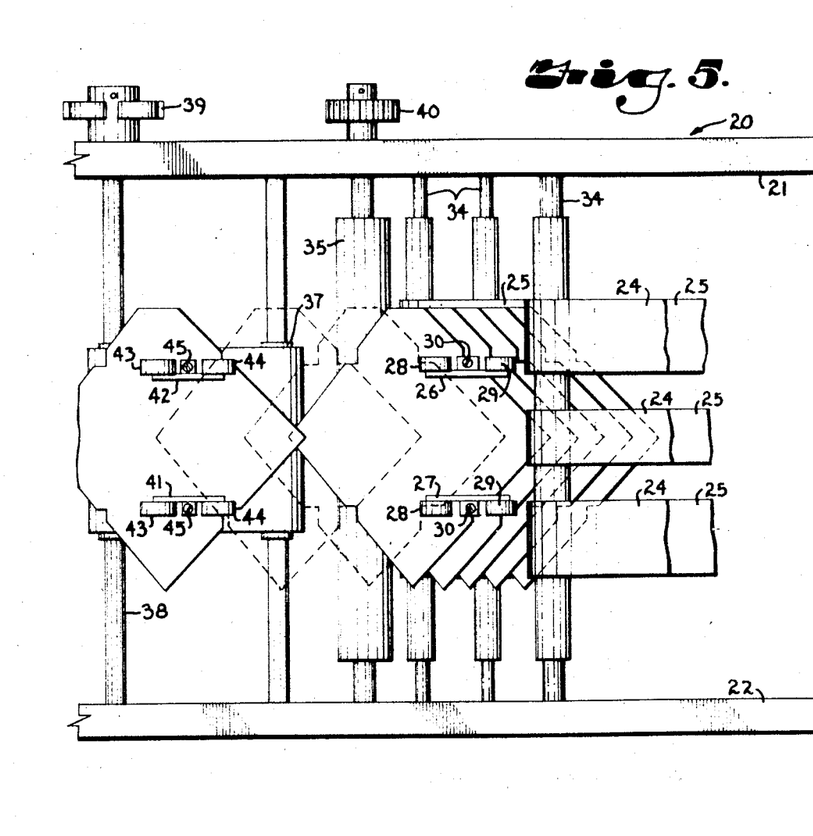
FIGS. 5 and 6 are plan views of the machine shown in FIG. 3.
Figure 6:
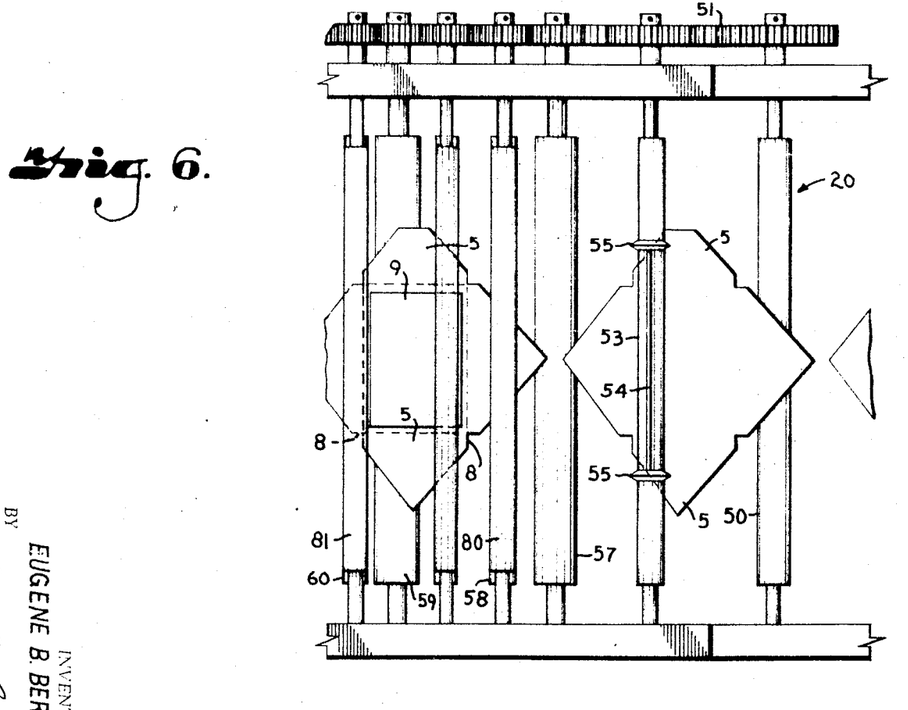
Figure 7:
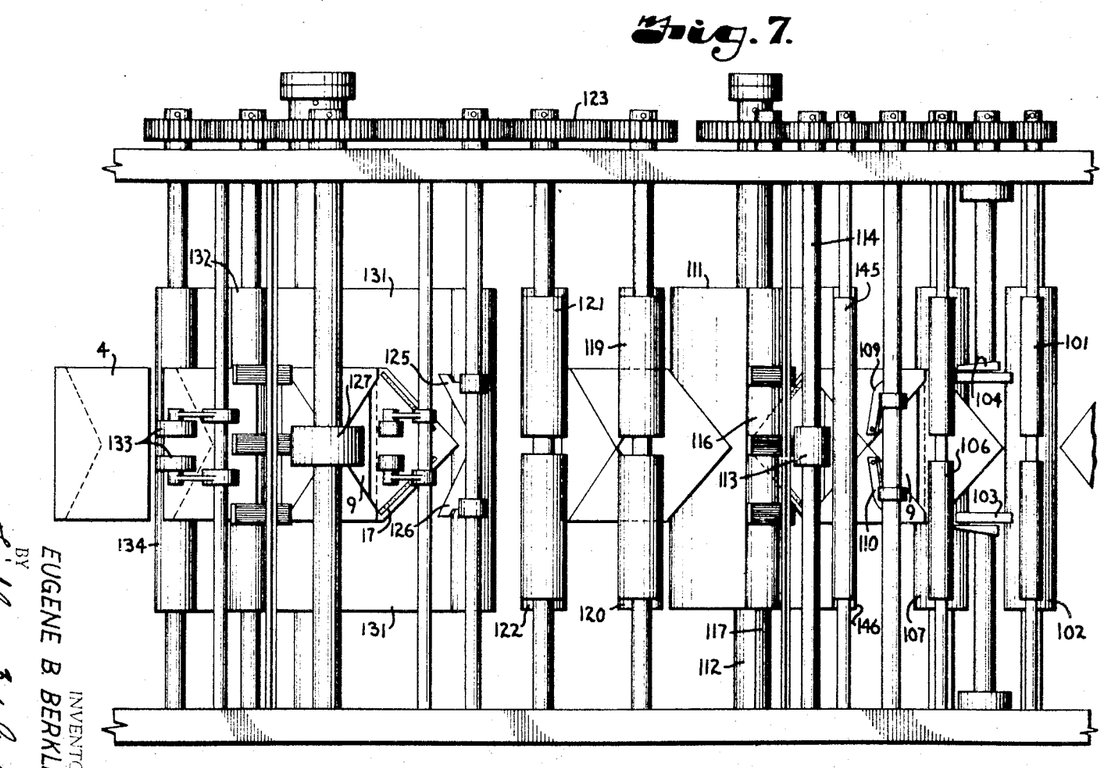
FIG. 7 is a plan view of the portion of the machine shown in FIG. 4.

Referring to FIGS. 3 and 5, the envelope blanks 1 are conveyed from the adhesive application and drying section (not shown) of the machine 20 between belts 24 and 25 respectively to the blank folding section of machine 20. Where adhesive strip 10 has not been applied to the closure flap 7 of blank 1 as shown in FIG. 2, the operation of passing of the blank 1 through the drying section of the rotary envelope making machine 20 is eliminated and the preshaped blanks 1 may be introduced to the blank folding section in a similar manner as that shown or by singularly introducing said blanks 1 to the folding section.

The blanks 1 are delivered from the dryer section and ahead of the blank folding section in an overlapping stepped position as shown in FIG. 5. In order to fold the blanks and enclose the insert 9, it is desirable to withdraw the blanks 1 from the overlapping stepped position in a sequential manner to singularly pass said blanks 1 through the folding section of the machine 20. This is accomplished in a conventional manner by passing said blanks 1 through a series of belts and rollers which extract the uppermost blank 1 from the formation of blanks and pass said blank 1 through the blank folding section of machine 20.

The machine 20 is illustrated as having a pair of laterally spaced carriages 26 and 27, each having fore and aft upper pressure rollers 28 and 29 respectively, axially mounted for rotation on carriages 26 and 27. The carriages 26 and 27 are mounted on an adjustable arm 30 extending outwardly and downwardly from a frame mounting, here illustrated as a clamp 31 axially mounted on a transverse shaft 32 having a screw 33 for clamping engagement with arm 30. By this arrangement, the carriages 26 and 27 may be adjusted in relation to belt 24 and the pressure exerted by the rollers 28 and 29 of carriages 26 and 27 may also be adjusted by movement of arm 30 in clamp 31. The rollers 28 and 29 on carriages 26 and 27 cooperate with belt 25 to move blanks 1 forwardly toward the blank folding section of machine 20. The belt 25 is mounted on rollers 34, some of which are illustrated, and is driven in a conventional manner (not shown).

After the blanks 1 pass under rollers 28 and 29 of carriages 26 and 27, they are propelled forwardly over driven roller 35 and on to belt 36. The belt 36 is mounted on rollers 37 and 38 whose shafts, like the shaft of roller 35, are journaled in side frames 21 and 22 of machine 20. The belt 36 is intermittently driven by means of a Geneva drive 39 operatively connected to the shaft of roller 38. Roller 35 is driven by means of a gear train 40 which is operatively connected to the main power source for operating machine 20. As the blanks 1 move forwardly on the conveyer belt 36, they encounter a second pair of laterally spaced carriages 41 and 42 having fore and aft rollers 43 and 44 respectively axially mounted thereto with said carriages being mounted on arm 45 which extends outwardly and downwardly from clamp 46. The clamp 46 is mounted to side frames 21 and 22 by means of a shaft 47 and brackets 48. The clamp 46 has a screw 49 which clampingly engages arm 45 and allows for adjustment of said arm. As the foremost blank 1 reaches the rollers 44 of carriages 41 and 42, it is driven forwardly and pulled out from the overlapping stepped formation of blanks but is not completely separated from said formation of blanks. The cooperative action of rollers 43 and 44 with the intermittent movement of belt 36 merely increases the spacing between the blanks which still remain in an overlapping stepped formation. The blank 1 is not completely withdrawn from said formation until it is grasped by rollers 50 and 50' and extracted from the remainder of the blanks.

As the blank 1 proceeds forwardly in the folding section in machine 20 from rollers 50 and 50', the notches 8 of blank 1 are engaged by fingers 52. After engagement by fingers 52 in the forward notches 8, straightening fingers 52' engage the rearward notches 8 of blank 1 as the blank is leaving rollers 50 and 50'. Straightening fingers 52' in cooperation with fingers 52 serve to align the blank 1 on the support surface 23 in order to position said blank for accurate scoring by the scoring roller 53. The scoring roller 53 has a pair of longitudinal knife edges 54 extending therefrom which engage the blank 1 to form score lines 11 and 12 and a pair of transverse knife edges 55 which form score lines 13 and 14 on blank 1. The scoring roller 53 is journaled in side frames 21 and 22 and driven by gear train 51 in a conventional manner.

After the blanks 1 have been scored in the manner previously described, said blanks 1 pass under an insert delivery device, here illustrated as vacuum wheels or cylinders 56 and 56', which place inserts 9 on the main body portion 2 of blank 1 by bringing said insert 9 into overlying, contacting relation with the body portion 2 of said blank 1 while said blank 1 and said insert 9 are being continuously and simultaneously propelled along the path. It should be noted that one or more of such devices may be utilized to extract the inserts 9 from a container or other support and deliver said inserts 9 to the blank 1.

Each of the cylinders 56 and 56' have an insert holding apparatus 61 which may be manually or mechanically fed, mounted in overlying relation to said cylinders 56 and 56'. The cylinders 56 and 56' and the holding apparatus 61 may be similar to that shown in the Skow Patents Nos. 2,853,296 and 2,635,538. Each of the insert delivery devices 61 are comprised of side frames 62 and 63 which guide the inserts 9 into an overlying contacting position in relation to the vacuum cylinders 56 and 56'. The side frames 62 and 63 may be mounted to the side frames 21 and 22 of machine 20 by a suitable structure or may be mounted on a suitable structure independent of machine 20. As illustrated, side frame 62 has a lowered lip portion 64 extending inwardly toward side frame 63 to support the rearward portion of insert 9. The side frame 63 has a lower extension member which comprises an upper guide 65 adjustably mounted thereto and having a rubber end tip 66. The upper guide 65 is adjustable in relation to the vacuum cylinder 56 or 56' to insure that only one insert 9 is withdrawn from the holding apparatus 61 upon each half revolution of the vacuum wheels 56 or 56'. The upper guide 65 has an adjusting device, here illustrated as a bracket 67, having spaced ears 68 with said bracket 67 being mounted to a cross frame member 69 and a sliding abutment plate 70. The cross frame member 69 is mounted to side frames 21 and 22 by suitable means. The abutment plate 70 is mounted to bracket 67 by means of a lug 71 and an adjustment screw 72. The adjustment screw 72 passes through lug 71 and each of said spaced ears 68 to provide vertical adjustment of said abutment 70 upon rotation of screw 71. The abutment plate 70 lies in abutting relation to upper guide 65 to retain guide 65 in the desired spaced relation from cylinders 56 or 56'.

A plurality of lower guides 73 are pivotally mounted to cross frame member 69 by means of two arms 74 which extend from pivotal connections 75 on cross members 69 to an adjustable connection 76 on transverse beam 77. The lower guides 73 being adjustably mounted on beam 77 are acruate in shape and with the vacuum cylinders 56 or 56' define a pass 78 through which inserts 9 are propelled. When the insert 9 comes in contact with the ports 79 in the periphery of either of the vacuum cylinders 56 or 56', through which a vacuum is drawn in a conventional manner, the lowermost insert 9 in the holding apparatus 61 is engaged by said vacuum and delivered to the envelope blank 1 passing beneath vacuum cylinders 56 and 56' in timed relation to the rotation of the vacuum cylinders 56 and 56'.

Forward of each vacuum cylinder 56 and 56' are a pair of cooperating driven cylinders 80 and 58 and 81 and 60 respectively which serve to register or align the insert 9 on the blank 1. The cylinders 80 and 58 and 81 and 60 have opposed driven feed surfaces, said surfaces being driven at the same surface speed as other rollers conveying blank 1 along the support surface 23, thereby stopping relative movement between insert 9 and blank 1 and thereby registering insert 9 on the main body portion 3 of blank 1. A second pair of opposed rollers 140 and 141 are positioned between the vacuum cylinders 56 and 56' to continue the propulsion of the insert 9 and blank 1 along the path while maintaining the registration of the insert 9 on the blank 1. The various pairs of rollers from the cylinder 56, all having opposed driving surfaces driven at the same directional speed are spaced such that continuous engagement of opposed driving surfaces is maintained between the upper engagement surface 9" and the lower surface 1" of the blank 1 to propel the blank 1 and insert 9 continuously at a high rate of speed from a point immediately following placement of the insert 9 on the blank 1 until the insert 9 is enclosed within the folded blank 1. In the illustrated embodiment, the various rollers from the vacuum cylinder 56 through the bottom flap folding mechanism are spaced such that the upper surface 9' of the uppermost insert 9 is continuously engaged by a driving surface having an opposed driving surface engaging the lower surface 1" of the blank 1. The driven cylinders 57 and 59 are positioned beneath the vacuum cylinders 56 and 56' respectively to reduce friction as the blanks 1 are driven over the supporting surface 23.

Figure 8:
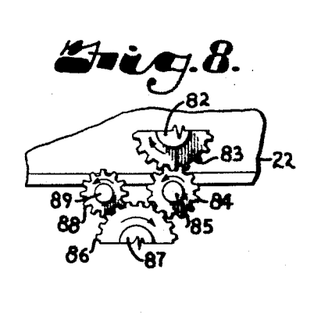
FIG. 8 is a side elevational view of the gear train arrangement to the vacuum wheel.

Referring to FIG. 8, a portion of gear train 51 is illustrated, to illustrate one way in which the vacuum cylinders 56 and 56' may be operated in timed sequence with the remainder of the driven cylinders to coordinate the movements of inserts 9 with blank 1. As illustrated, a shaft 82 on which cylinder 56 is mounted extends outwardly through side frame 21 of machine 20 and has gear 83 mounted thereon. The gear 83 is operated by means of gear 84 mounted on shaft 85 of the driven cylinder 57 which is, in turn, operated by gear 86 mounted on a shaft 87 and operatively connected to the main power system of machine 20. Gear 86 also meshes with gear 88 to drive shaft 89 of cylinder 58.

Figure 9:
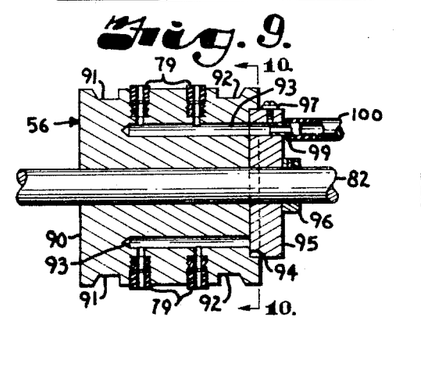
FIG. 9 is a vertical cross-sectional view through the vacuum wheel.
Figure 10:
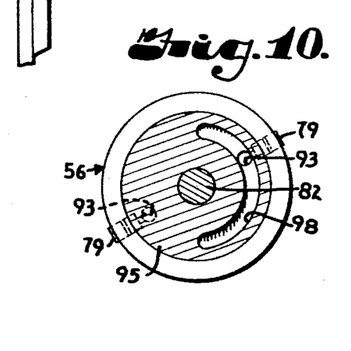
FIG. 10 is a vertical cross-sectional view along line 10—10 in FIG. 9.

Referring to FIGS. 9 and 10, the vacuum cylinder 56, being identical to cylinder 56', is illustrated as having a cylindrical body 90 having annular grooves 91 and 92, two diametrically opposed pairs of suction ports 79, each of the ports 79 of the respective pairs being interconnected by manifold channels 93 which open inwardly from a recess 94 at one end of the cylinder 56. A valving disc 95 is retained in recess 94 by collar 96 and secured against rotation by arms 97 which is secured to the frames 21 or 22 by suitable means. The disc 95 has an arcuate channel 98 adapted to register with the manifold channels 93 to successively establish and disestablish a vacuum through ports 79 as the cylinder 56 rotates on shaft 82. The valve disc carries a nipple 99 to which a flexible hose 100 is secured to connect cylinder 56 to a vacuum pump (not shown).

As the cylinder 56 is rotated on shaft 82 in timed sequence to the remainder of the envelope folding section of machine 20, the channel 98 of the fixed valving disc 95 is in communicatioin with the manifold channel 93 to provide a vacuum at ports 79 as said ports 79 contact the lowermost insert 9 in the holding apparatus 61. The insert 9 is engaged by cylinder 56 by means of the vacuum and is driven through pass 78 wherein the arcuate channel 98 loses communication with the manifold channel 93 thereby breaking the vacuum at ports 79 and releasing insert 9 as it is in contacting relation to blank 1.

The section of machine 20 containing vacuum cylinders 56 and 56' and the related driven cylinders may be inserted into a standard conventional rotary envelope making machine, thereby eliminating the necessity of special machines to accomplish the enclosure of inserts during the envelope formation process.

After the insert 9 has been placed on the blank 1, the blank is propelled forwardly at a high rate of speed by means of driven cylinders or feed rollers 101 and 102 to the side flap folding station F where blank 1 passes beneath folding rails 103 and side flaps 5 are folded over insert 9 and the main body portion 2 of envelope blank 1 by means of a pair of pushers 104. The cylinders 101 and 102 are properly spaced from the driven cylinders 81 and 60 so as to engage the upper engagement surface 9″ before engagement is lost by the cylinders 81 and 60 to maintain the position of the insert 9 on the blank 1 while said insert 9 and blank 1 are being propelled at a high rate of speed. The pushers 104 operate reciprocally in a transverse direction perpendicular to the path of envelope blank 1 to fold the side flaps 5 along score lines 13 and 14. The folding of the side flaps is assisted by a pair of arms 105 which swing transversely to the path of the envelope blank 1 and assist in overcoming the air resistance encountered in the folding of said flaps. The envelope blank 1 and the insert 9 then pass between upper and lower feed rollers 106 and 107 respectively which are properly spaced from the feed rollers 101 and 102 to continue engagement of the engagement surface 9″ and which act to press the folds of the side flaps 5 and bring said side flaps into contact with the main body portion 2 of blanks 1 and insert 9.

The envelope blank 1 and insert 9 are then advanced to station G where adhesive strip 16 is applied to the bottom flap 6. An adhesive roller 108 whose shaft is journaled in side frame members 21 and 22 and is driven by gear train 51 supplies adhesive to a pair of applicators 109 and 110 which apply adhesive strips 16 in a conventional manner to the bottom flap 6 of envelope blank 1. The envelope blank 1 and insert 9 are then advanced to station H by a pair of driven cylinders or feed rollers 145 and 146, properly spaced from rollers 106 and 107 to continue the engagement of the engagement surface 9″ where the bottom flap 6 is folded into overlying contacting relation to side flaps 5 to thereby seal said bottom flap 6 to side flaps 5. The folding of the bottom flap 6 is effected by means of a suction roller 111 mounted on shaft 112 which is journaled in side frames 21 and 22 and driven by gear train 51, an upper suction roller 113 mounted on shaft 114, trap 115 and an upper roller 116 mounted on shaft 117. The suction roller 113 seizes the bottom flap 6 and carries it upwardly within trap 115 after which one row of suction ports 118 in the suction roller 111 engages the body portion 2 of the envelope blank just to the rear of the score line 12 to move that portion of the blank forwardly and fold the blank at the score line 12. The vacuum to the suction roller 113 is then cut off by suitable mechanism and the blanks proceed out of trap 115 between the suction roller 111 and upper roller 116 to press the bottom flap 6 and adhesive strip 16 against the side flaps 5 to thereby seal said bottom flap 6.

Envelope blank 1 is then conveyed through two pairs of feed rollers 119, 120, 121 and 122 with the shafts of said rollers being driven by gear train 123 to station H. At station H, the adhesive strip 17 may be applied to the envelope blank as shown in FIG. 2 or the adhesive strip 10 may have moisture applied thereto as shown in FIG. 1, or both operations may be omitted, thus producing an envelope with an insert enclosed therein with an open closure flap, thus allowing enclosure of additional inserts. An adhesive roller 124 supplies adhesive or moisture to applicators 125 and 126 in a conventional manner for placement of said adhesive or moisture on the closure flap 7 of the envelope blank 1.

The envelope blank 1 is then conveyed to station I where the closure flap 7 is folded into overlying contacting relation with side flaps 5 and bottom flap 6 and may or may not seal said envelope, depending upon the inclusion or omission of station H1. An upper section roller 127 has two ports 128 which seize the folded bottom flap 6 thus advancing the main body portion 2 of the envelope blank 1 upwardly into a trap 129. The vacuum to suction ports 128 is then cut off by a suitable valve mechanism and the closure flap 7 is seized by suction ports 130 in lower suction roller 131 to bend the envelope blank 1 at score line 11. With the envelope blank 1 so folded by the action of suction rollers 127 and 131, the envelope blank 1 is passed between upper roller 132 and suction roller 131 to press the closure flap into overlying contacting relation with the side flaps 5 and bottom flap 6 which may or may not seal said closure flaps 7 as previously discussed. The envelope is then conveyed by rollers 133 and 134 to a collecting point.

It is to be understood that while I have illustrated and described one form of my invention, it is not to be limited to the specific form or arrangement of parts herein described and shown except insofar as such limitations are included in the claims.

What is claimed is:

1. A method of forming an envelope of a mailing type around at least one insert in an envelope-making process from a blank having upper and lower surfaces defining a body portion with side, bottom and closure flaps extending from said body portion and score lines along the juncture of the bottom and closure flaps with the body portion, said method including the steps of:
  (a) continuously propelling said individual envelope blanks along a path at a high speed,
  (b) bringing an insert into overlying, contacting relation with the body portion of said blank while said blank and said insert are being continuously and simultaneously propelled along said path, said insert and blank combining to form an upper engagement surface,
  (c) continuously effecting an engagement of opposed driven feed surfaces with said upper engagement surface and the lower surface of said blank respectively to continue the high speed propulsion of said insert and blank simultaneously along said path while maintaining the relative position of the insert on the body portion of the blank, said engagement immediately following the bringing of the insert into contacting relation with said blank and continuing until said blank is enclosed about said insert, said driven surfaces having the same directional speed,
  (d) folding and adhering said side and bottom flaps together in enclosed relation to said insert while said blank and said insert are being so continuously propelled along said path by the continuous engagement at said opposed driven feed surfaces,
  (e) applying adhesive to the closure flap of the blank, drying said adhesive, and
  (f) applying moisture to the dried adhesive on the closure flap after the folding and adhering of the side and bottom flaps, and folding said closure flap into contacting relation with a portion of the blank to thereby seal the envelope, said moisture application and closure flap folding occurring as said blank and insert are being continuously propelled along said path.

2. A method of forming an envelope of a mailing type around at least one insert in an envelope-making process from a blank having upper and lower surfaces defining a body portion with said, bottom and closure flaps extending from said body portion and score lines along the juncture of the bottom and closure flaps with the body portion, said method including the steps of:

(a) continuously propelling said individual envelope blanks along a path at a high speed, (b) bringing an insert into overlying, contacting relation with the body portion of said blank while said blank and said insert are being continuously and simultaneously propelled along said path, said insert and blank combining to form an upper engagement surface, (c) continuously effecting engagement of opposed driven feed surfaces with said upper engagement surface and the lower surface of said blank respectively to continue the high speed propulsion of said insert and blank simultaneously along said path while maintaining the relative position of the insert on the body portion of the blank, said engagement immediately following the bringing of the insert into said contacting relation with the blank and continuing until the blank is enclosed about said insert, said driven surfaces having the same directional speed, (d) folding and adhering said side and bottom flaps together in enclosing relation to said insert while said blank and said insert are being so continuously propelled along said path by the continuous engagement at said opposed driven feed surfaces, (e) applying adhesive to the closure flap of said blank on a portion thereof engageable with a portion of the envelope when the closure flap is folded into contacting relation with said portion, and (f) folding said closure flap into contacting relation with said portion to thereby seal said envelope, said adhesive application and closure flap folding occurring as said blank and insert are being continuously propelled along said path.

3. An apparatus forming envelopes around at least one insert, said envelope being formed from a blank having a body portion with side, bottom and closure flaps extending from said body portion, said apparatus comprising:

(a) a frame, (b) means connected to said frame for continuously moving the envelope blanks along a path at a high rate of speed, (c) means associated with said frame and along said path for propelling said insert at substantially the same directional speed as said blank and said insert into contacting relation with the body portion of said blank, (d) means on said frame and along said path for folding and adhering said side and bottom flaps together in enclosing relation to said insert, and (e) means having driven feed members with opposed driving feed surfaces adjacent the insert feeding means and along said path for continuously maintaining registration of the insert relative to the body portion of the blank from a point immediately following placement of the insert on the blank until said side and bottom flaps are folded and adhered about said insert, (f) the closure flap having moisture activated adhesive thereon and the apparatus including means on said frame and along said path for applying moisture to said adhesive on said closure flap and means on said frame and along said path for folding the closure flap into contacting relation with a portion of the blank to thereby seal said envelope.

4. A method of forming an envelope around at least one insert in an envelope making process from a blank having upper and lower surfaces defining a body portion with a bottom flap extending from said body portion, said method including the steps of:

(a) continuously propelling said blank along a path at a high rate of speed with said body portion exposed, (b) bringing an insert into overlying contacting non-adhering relation with the body portion of said blank while said blank and said insert are being continuously and simultaneously propelled along said path, said insert and blank combining to form an upper engagement surface, (c) continuously effecting engagement of opposed driven feed surfaces with said upper engagement surface and the lower surface of said blank respectively to continue the high speed propulsion of said insert and blank simultaneously along said path while maintaining the relative position of the insert on the body portion of the blank, said engagement immediately following the bringing of the insert into said non-adhering contacting relation with said blank and continuing until said blank is enclosed about said insert, said driven surfaces having the same directional speed, and (d) folding said bottom flap in enclosing relation to said insert while said blank and said insert are being so continuously propelled along said path by the continuous engagement at said opposed driven feed surfaces.

5. A method as recited in claim 4 wherein said blank includes side flaps and including the steps of:

(a) folding said side flaps over said insert, (b) applying adhesive to the bottom flap on a portion thereof engageable with the side flaps when said bottom flap is folded into contacting relation to the side flaps, and (c) folding said bottom flap into contacting relation with said side flaps to thereby adhere said bottom flap to said side flaps in enclosing relation to said insert.

6. A method of forming an envelope as recited in claim 4 wherein said blank includes a closure flap and including the step of:

(a) scoring said blank along the juncture of the bottom and closure flaps with the body portion of said blank after placement of the insert in said non-adhering contacting relation to the body portion of said blank.

7. An apparatus for forming an envelope around at least one non-adhering insert, said envelope being formed from a blank having a body portion with a bottom flap extending from said body portion, said apparatus comprising:

(a) a frame, (b) means connected to said frame for continuously moving the blank along a path at a high rate of speed with said body portion exposed, (c) means associated with said frame and along said path for propelling said insert at substantially the same directional speed as said blank and said insert into non-adhering contacting relation with the body portion of said blank, (d) means on said frame and along said path for folding said bottom flap in enclosing relation to said insert, and (e) driven feed members having opposed driving feed surfaces adjacent the insert feeding means and along said path, said driving feed surfaces being positioned for continuously urging engagement of the insert against the body portion of the blank from a point immediately following placement of the insert on the blank until said bottom flap is folded about said insert.

8. An apparatus as recited in claim 7 wherein:

(a) said driven feed members constitute roller sets spaced apart a distance less than the width of said insert along said path.

9. An apparatus as recited in claim 7 wherein said blank includes side flaps and wherein said apparatus includes:
  (a) means on said frame and along said path folding said side flaps over said insert,
  (b) means on said frame and along said path applying adhesive to the bottom flap on a portion thereof engageable with the side flaps when said bottom flap is folded into contacting relation with the side flaps, and
  (c) means on said frame and along said path folding said bottom flap into contacting relation with said side flaps thereby adhering said bottom flap to said side flaps in enclosing relation to said insert.

10. An apparatus for forming envelopes as recited in claim 7, wherein the body portion of the blank includes a closure flap and wherein:
  (a) said apparatus includes means on said frame and along said path applying adhesive to the closure flap and folding the closure flap against the blank.

11. An apparatus as recited in claim 7 wherein the body portion of the blank includes a closure flap and including:
  (a) means on said frame and along said path scoring said blank along the juncture of the bottom and closure flaps with the body portion of said blank.

References Cited

UNITED STATES PATENTS

| | | | |
|---|---|---|---|
| 3,162,434 | 12/1964 | Hepp | 270—45 X |
| 2,126,804 | 8/1938 | Overly. | |
| 2,206,043 | 7/1940 | Novick. | |
| 2,851,934 | 9/1958 | Heywood | 93—62 |
| 2,983,201 | 5/1961 | Winkler et al. | 93—62 |
| 3,079,847 | 5/1963 | Polidori | 93—62 |

THERON E. CONDON, Primary Examiner

NEIL ABRAMS, Assistant Examiner

U.S. Cl. X.R.

53—206, 209; 93—61